(12) United States Patent
Ameling (10) Patent No.: US 10,958,616 B2
(45) Date of Patent: Mar. 23, 2021

(54) METHODS, SYSTEMS, AND COMPUTER READABLE MEDIA FOR NETWORK TEST CONFIGURATION USING VIRTUAL LOCAL AREA NETWORK (VLAN) SCANNING

(71) Applicant: Keysight Technologies Singapore (Sales) Pte. Ltd., Singapore (SG)

(72) Inventor: Thomas Ameling, Woodland Hills, CA (US)

(73) Assignee: KEYSIGHT TECHNOLOGIES SINGAPORE (SALES) PTE. LTD., Singapore (SG)

( * ) Notice: Subject to any disclaimer, the term of this patent is extended or adjusted under 35 U.S.C. 154(b) by 795 days.

(21) Appl. No.: 15/208,590

(22) Filed: Jul. 12, 2016

(65) Prior Publication Data

US 2018/0019967 A1  Jan. 18, 2018

(51) Int. Cl.
| | |
|---|---|
| *G06F 15/177* | (2006.01) |
| *H04L 29/12* | (2006.01) |
| *H04L 12/46* | (2006.01) |
| *H04L 12/66* | (2006.01) |
| *H04L 12/26* | (2006.01) |
| *H04L 12/24* | (2006.01) |

(52) U.S. Cl.
CPC ........ *H04L 61/103* (2013.01); *H04L 12/4641* (2013.01); *H04L 12/4679* (2013.01); *H04L 12/66* (2013.01); *H04L 43/50* (2013.01); *H04L 41/0866* (2013.01)

(58) Field of Classification Search
CPC ............... H04L 61/103; H04L 12/4641; H04L 12/4679; H04L 12/66; H04L 43/50; H04L 41/0866
See application file for complete search history.

(56) References Cited

U.S. PATENT DOCUMENTS

| | | |
|---|---|---|
| 6,625,764 B1 | 9/2003 | Dawson |
| 7,385,973 B1 | 6/2008 | Johnson et al. |
| 7,496,052 B2 | 2/2009 | Jain et al. |
| 2003/0217039 A1* | 11/2003 | Kurtz .................. G02B 5/3083 |

(Continued)

OTHER PUBLICATIONS

Cho, Kang, and Lee. "Centralized ARP Proxy Server Over SDN Controller To Cut Down ARP Broadcast in Large-scale Data Center Networks." 2015 ICOIN. Jan. 12-14, 2015. Cambodia. Retrieved online via IEEE XPlore digital library. <URL:https://ieeexplore.ieee.org/abstract/document/7057900> (Year: 2015).*

(Continued)

*Primary Examiner* — Phuoc H Nguyen (57) ABSTRACT

Methods, systems, and computer readable media for network test configuration using VLAN scanning are disclosed. One method for network test configuration using VLAN scanning occurs at a first port of a network equipment test device. The method includes sending a plurality of address resolution protocol (ARP) requests to a system under test (SUT), wherein each of the plurality of ARP requests includes a different virtual local area network (VLAN) identifier (ID). The method also includes receiving an ARP response from the SUT, wherein the ARP response indicates a first VLAN ID associated with the SUT. The method further includes using the first VLAN ID when sending test packets to the SUT via the first port.

15 Claims, 5 Drawing Sheets

(56) References Cited

U.S. PATENT DOCUMENTS

| | | |
|---|---|---|
| 2004/0042416 A1 | 3/2004 | Ngo et al. |
| 2006/0140128 A1 | 6/2006 | Chi et al. |
| 2006/0193300 A1* | 8/2006 | Rawat ................. H04L 63/1408 370/338 |
| 2013/0185416 A1 | 7/2013 | Larkin et al. |
| 2014/0341223 A1 | 11/2014 | Carrie |
| 2016/0182310 A1 | 6/2016 | Gintis |

OTHER PUBLICATIONS

Notification of Transmittal of the International Search Report and the Written Opinion of the International Searching Authority, or the Declaration for International Application No. PCT/US2017/038393 (Sep. 21, 2017).

"Xcellon-UltraTM NP-10GbE High Performance Application Load Modules," Ixia, Data Sheet, Document No. 915-0710-01 Rev D, pp. 1-8 (Feb. 2013)

Mandeville et al., "Benchmarking Methodology for LAN Switching Devices," RFC 2889, pp. 1-35 (Aug. 2000).

Bradner et al., "Benchmarking Methodology for Network Interconnect Devices," RFC 2544, pp. 1-31 (Mar. 1999).

Mandeville, "Benchmarking Terminology for LAN Switching Devices," RFC 2285, pp. 1-25 (Feb. 1998).

* cited by examiner

```
Frame 1: 60 bytes on wire (480 bits), 60 bytes captured (480 bits) on interface 0
Ethernet II, Src: 00:12:01:00:00:01 (00:12:01:00:00:01), Dst: ff:ff:ff:ff:ff:ff (ff:ff:ff:ff:ff:ff)
802.1Q Virtual LAN
    000. .... .... .... = Priority: 0
    ...0 .... .... .... = CFI: 0
    .... 0000 0000 0001 = ID: 1
    Type: ARP (0x0806)
    Padding: 000000000000000000000000000000000000
Address Resolution Protocol (request)
    Hardware type: Ethernet (1)
    Protocol type: IP (0x0800)
    Hardware size: 6
    Protocol size: 4
    Opcode: request (1)
    Sender MAC address: 00:12:01:00:00:01 (00:12:01:00:00:01)
    Sender IP address: 100.1.0.1 (100.1.0.1)
    Target MAC address: 00:00:00:00:00:00 (00:00:00:00:00:00)
    Target IP address: 100.1.0.100 (100.1.0.100)
```

```
Frame 2: 46 bytes on wire (368 bits), 46 bytes captured (368 bits) on interface 0
Ethernet II, Src: 00:11:01:00:00:01 (00:11:01:00:00:01), Dst: 00:12:01:00:00:01 (00:12:01:00:00:01)
802.1Q Virtual LAN
    000. .... .... .... = Priority: 0
    ...0 .... .... .... = CFI: 0
    .... 0000 0110 0100 = ID: 100
    Type: ARP (0x0806)
Address Resolution Protocol (reply)
    Hardware type: Ethernet (1)
    Protocol type: IP (0x0800)
    Hardware size: 6
    Protocol size: 4
    Opcode: reply (2)
    Sender MAC address: 00:11:01:00:00:01 (00:11:01:00:00:01)
    Sender IP address: 100.1.0.100 (100.1.0.100)
    Target MAC address: 00:12:01:00:00:01 (00:12:01:00:00:01)
    Target IP address: 100.1.0.1 (100.1.0.1)
```

METHODS, SYSTEMS, AND COMPUTER READABLE MEDIA FOR NETWORK TEST CONFIGURATION USING VIRTUAL LOCAL AREA NETWORK (VLAN) SCANNING

TECHNICAL FIELD

The subject matter described herein relates to network test configuration. More specifically, the subject matter relates to methods, systems, and computer readable media for network test configuration using virtual local area network (VLAN) scanning.

BACKGROUND

Network operators typically test network nodes for reliability and other characteristics before deploying the network nodes in live (e.g., non-test environments). Generally, it is important to test networks nodes with various amounts of traffic and different types of traffic. For example, a test platform, such as an IxNetwork™ platform manufactured by Ixia, may be usable for network topology testing and traffic analysis and may generate realistic, dynamically-controllable data-plane traffic, such as multiple packets flows, for testing various network nodes using one or more protocols.

Network test configuration is typically needed before a test platform can test one or more network nodes. For example, when trying to start a test, a user of a test platform may observe that the test fails in the preflight check because the control plane is not properly configured. In this example, the user may spend a significant amount of time opening an SSH connection to a device under test (DUT) and comparing network configuration settings in the test platform with settings in the DUT. However, manually checking network configuration settings (e.g., an Internet protocol (IP) address, a subnet mask, a gateway IP address, and an virtual local area network (VLAN) identifier) for a plurality of test ports involved in testing a DUT does not scale well and can be very time consuming, e.g., since some tests can involve a significant number (e.g., hundreds or even thousands) of test ports.

SUMMARY

Methods, systems, and computer readable media for network test configuration using virtual local area network (VLAN) scanning are disclosed. One method occurs at a first port of a network equipment test device. The method includes sending a plurality of address resolution protocol (ARP) requests to a system under test (SUT), wherein each of the plurality of ARP requests includes a different VLAN identifier (ID). The method also includes receiving an ARP response from the SUT, wherein the ARP response indicates a first VLAN ID associated with the SUT. The method further includes using the first VLAN ID when sending test packets to the SUT via the first port.

A system for network test configuration using VLAN scanning includes at least one processor and a network equipment test device implemented using the at least one processor. The network equipment test device is configured for performing actions at a first port of the network equipment test device. The actions include: sending a plurality of ARP requests to a SUT, wherein each of the plurality of ARP requests includes a different VLAN ID; receiving an ARP response from the SUT, wherein the ARP response indicates a first VLAN ID associated with the SUT; and using the first VLAN ID when sending test packets to the SUT via the first port.

The subject matter described herein may be implemented in software in combination with hardware and/or firmware. For example, the subject matter described herein may be implemented in software executed by a processor. In some embodiments, the subject matter described herein may be implemented using a non-transitory computer readable medium having stored thereon computer executable instructions that when executed by the processor of a computer control the computer to perform steps. Various computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors, network interfaces, and memory.

As used herein, each of the terms "function" and "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for network test configuration using virtual local area network (VLAN) scanning. When testing network nodes, a test platform may be capable of performing various tests with various goals by generating network traffic and monitoring and/or analyzing a network node's response to the network traffic. However, issues can arise if the test platform and/or test related components (e.g., test ports) are not properly configured.

In accordance with some aspects of the subject matter described herein, techniques, methods, or mechanisms for automatically detecting and/or provisioning VLAN information for testing a system or device under test. For example, a network test system may be configured to perform VLAN discovery by sending, via a first port, a plurality of ARP requests to a system under test (SUT) or node therein. In this example, each ARP request may be configured with a different VLAN ID. Continuing with this example, after transmission of the ARP requests, the first port may wait for an ARP response containing an appropriate VLAN ID associated with the SUT or node therein.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
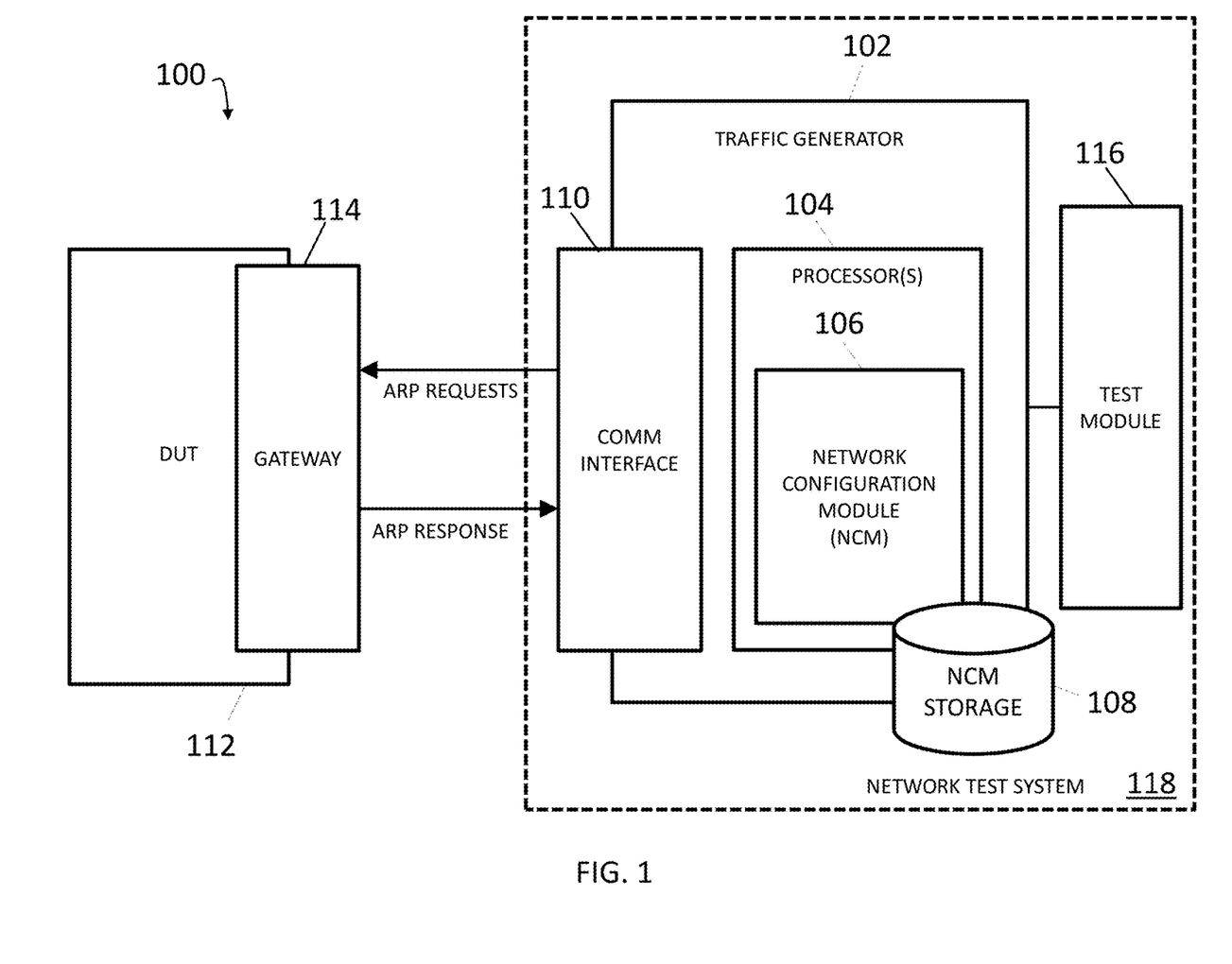
FIG. 1 is a block diagram illustrating an environment for network test configuration using VLAN scanning according to an embodiment of the subject matter described herein.

FIG. 1 is a diagram illustrating an environment 100 for network test configuration using VLAN scanning according to an embodiment of the subject matter described herein. Referring to FIG. 1, environment 100 may include network test system 118, a device under test (DUT) 112, and a gateway 114. Network test system 118 may represent any suitable entity or entities (e.g., one or more computing platforms, a network equipment test device, or a server farm) for performing aspects related to network test configuration, VLAN scanning, and/or network node testing. In some embodiments, network test system 118 may be configured to perform one or more aspects associated with testing a network, a system under test (SUT), such as DUT 112, and/or components of network test system 118. For example, network test system 118 may send microbursts of packets from test ports to test ports via DUT 112 for testing a peak traffic load and/or buffering capabilities. For example, a microburst may involve sending packets from a test port to DUT 112 faster than DUT 112 can send (e.g., switch) them to a second test port. In this example, network test system 118 may perform various microburst related tests to determine a peak load that can be sustained by DUT 112 without packet loss and/or to determine related buffering capacities.

In some embodiments, network test system 118 may be a stand-alone tool, a testing device, or software executing on a processor. In some embodiments, network test system 118 may be a single node or may be distributed across multiple computing platforms or nodes.

In some embodiments, network test system 118 may be integrated or co-located with a user device emulator, also referred to as a user equipment (UE) simulator. The user device emulator may include functionality for simulating or emulating one or more 3GPP (e.g., LTE or LTE-advanced) user devices or other user devices, e.g., sending communications, receiving communications, and/or testing communications capabilities of various nodes or components. For example, network test system 118 may be configured to generate control plane commands that trigger establishment of one or more tunnels for numerous emulated user devices to communicate with a packet data network, such as the Internet.

In some embodiments, network test system 118 may simulate or emulate one or more network nodes. For example, network test system 118 may emulate a network switch or forwarding device. In some embodiments, the emulated network node(s) may interact with other emulated entities (e.g., emulated user devices) and/or DUT 112.

DUT 112 may represent any suitable entity or entities (e.g., one or more computing platforms, a network switch, a network node or a SUT) for interacting with and/or for being tested and/or analyzed by network test system 118. In some embodiments, DUT 112 may include a network switch or other packet forward device. For example, DUT 112 may be a commercial network switch capable of receiving traffic (e.g., from network test system 118) via one or more ports, processing (e.g., switching) traffic, and/or sending traffic (e.g., to network test system 118) via one or more ports. In some embodiments, For example, DUT 112 may include a gateway (e.g., gateway 114) or gateway functionality capable of receiving and responding to ARP requests that are associated with a related VLAN.

Network test system 118 may include a test module 116. Test module 116 may be any suitable entity or entities (e.g., an application-specific integrated circuit (ASIC), a field-programmable gate array (FPGA), and/or software executing on a processor) for traffic testing, test analysis, related configurations, and/or other functionality as described in RFCs 2889, 2285, and/or 2544. For example, network test system 118 and/or test module 116 may initiate testing of DUT 112 using one or more traffic generators, such as traffic generator 102.

Traffic generator 102, also referred to as a port module, may be any suitable entity or entities (e.g., an ASIC, an FPGA, and/or software executing on a processor) for receiving data, transmitting data, and/or processing data. For example, a port module may comprise an Xcellon-Ultra™ card manufactured by IXIA® or a portion therein (e.g., a physical port with a dedicated processor and memory) and may be configured to simulate or emulate packets associated with various nodes or UEs. In this example, multiple port modules may comprise a different portion (e.g., a separate physical port and associated resources) of the Xcellon-Ultra™ card or may be associated with a different Xcellon-Ultra™ card.

In some embodiments, traffic generator 102 may include at least one processor, memory, and/or one or more network interface cards (NICs), such as communications interface 110. The NICs may receive data from or transmit data to DUT 112 via one or more physical or virtual ports, communications interfaces, or connections. In some embodiments, communications interface 110 may include functionality for communicating using a common public radio interface (CPRI) protocol or other protocols. For example, a CPRI interface and/or link may provide data from traffic generator 102 to gateway 114 and vice versa.

Gateway 114 may be any suitable entity or entities (e.g., an ASIC, an FPGA, and/or software executing on a processor) for receiving data, transmitting data, and/or processing data. For example, gateway 114 may include an IP gateway capable of receiving and responding to ARP requests that are associated with a related VLAN. In this example, gateway 114 may ignore or discard ARP requests that do not contain its same VLAN ID, but may respond to ARP request that do contain its same VLAN ID.

In some embodiments, network test system 118, gateway 114, and/or DUT 112 may be communicatively coupled via various physical topologies and/or virtual topologies. For example, ports associated with traffic generator 102 and gateway 114 may be communicatively coupled via a full mesh virtual topology, a partial mesh virtual topology, or any topology described in RFCs 2285, 2544, or 2889; the disclosures of which are incorporated herein by reference in their entireties.

In some embodiments, DUT 112 and gateway 114 may be communicatively coupled via various physical topologies and/or virtual topologies. For example, DUT 112 and gateway 114 may be communicatively coupled via various network topologies.

Network test system 118 and/or traffic generator 102 may include one or more processor(s) 104, a network configuration module (NCM) 106, and an NCM storage 108. Processor(s) 104 may be any suitable entity or entities for executing software and/or modules (e.g., NCM 106) stored in a memory (e.g., NCM storage 108 and/or other memory). In some embodiments, processor(s) 104 may include a microprocessor, a central processing unit (CPU), or any other like hardware based processing unit. In some embodiments, NCM 106 and/or various aspects of the disclosed subject matter can be stored in NCM storage 108 or other memory.

NCM storage 108 may represent any suitable entity (e.g., a non-transitory computer readable medium, random access memory (RAM), read only memory (ROM), optical read/write memory, cache memory, magnetic read/write memory, flash memory, embedded memory, or a memory device) for storing data associated with traffic testing. Data stored at NCM storage 108 may include one or more traffic tests, test configurations, test results, traffic generated during tests, traffic received during tests, test statistics, test logs, and/or information about one or more DUT, e.g., DUT 112.

In some embodiments, processor(s) 104 and/or NCM storage 108 can be used to execute, implement, and/or manage various aspects of test network configuration and/or VLAN scanning, such as NCM 106 or portions thereof.

NCM 106 may be any suitable entity or entities (e.g., an ASIC, an FPGA, and/or software executing on processor(s) 104) for performing one or more aspects associated with network test configuration and/or detecting and/or provisioning VLAN information for DUT 112. For example, NCM 106 may send, via a first port, a plurality of ARP requests (e.g., up to 4094 ARP requests) to gateway 114. In this example, each ARP request may be configured with a different VLAN ID. Continuing with this example, after sending the ARP requests, NCM 106 and/or the first port may wait for an ARP response containing an appropriate VLAN ID associated with gateway 114.

In some embodiments, network test system 118 and/or NCM 106 may include functionality for logging configuration information, e.g., a detected or identified VLAN ID, for each test port (e.g., traffic generator 102). For example, after traffic generator 102 performs VLAN scanning by sending a plurality of ARP requests to gateway 114 and receives an ARP response containing a relevant VLAN ID from gateway 114, traffic generator 102 or another entity (test module 116) may store the VLAN ID information and may use this information when generating test packets that are transmitted via the respective test ports, such that the test packets sent by traffic generator 102 contain the appropriate VLAN ID information. In this example, multiple traffic generators may be capable of identifying appropriate VLAN ID information via VLAN scanning using ARP.

It will be appreciated that FIG. 1 is for illustrative purposes and that various nodes, their locations, and/or their functions (e.g., modules) described above in relation to FIG. 1 may be changed, altered, added, or removed. For example, some nodes and/or functions may be combined into a single entity. In another example, some nodes and/or functions may be distributed across multiple nodes and/or platforms.

Figure 2:
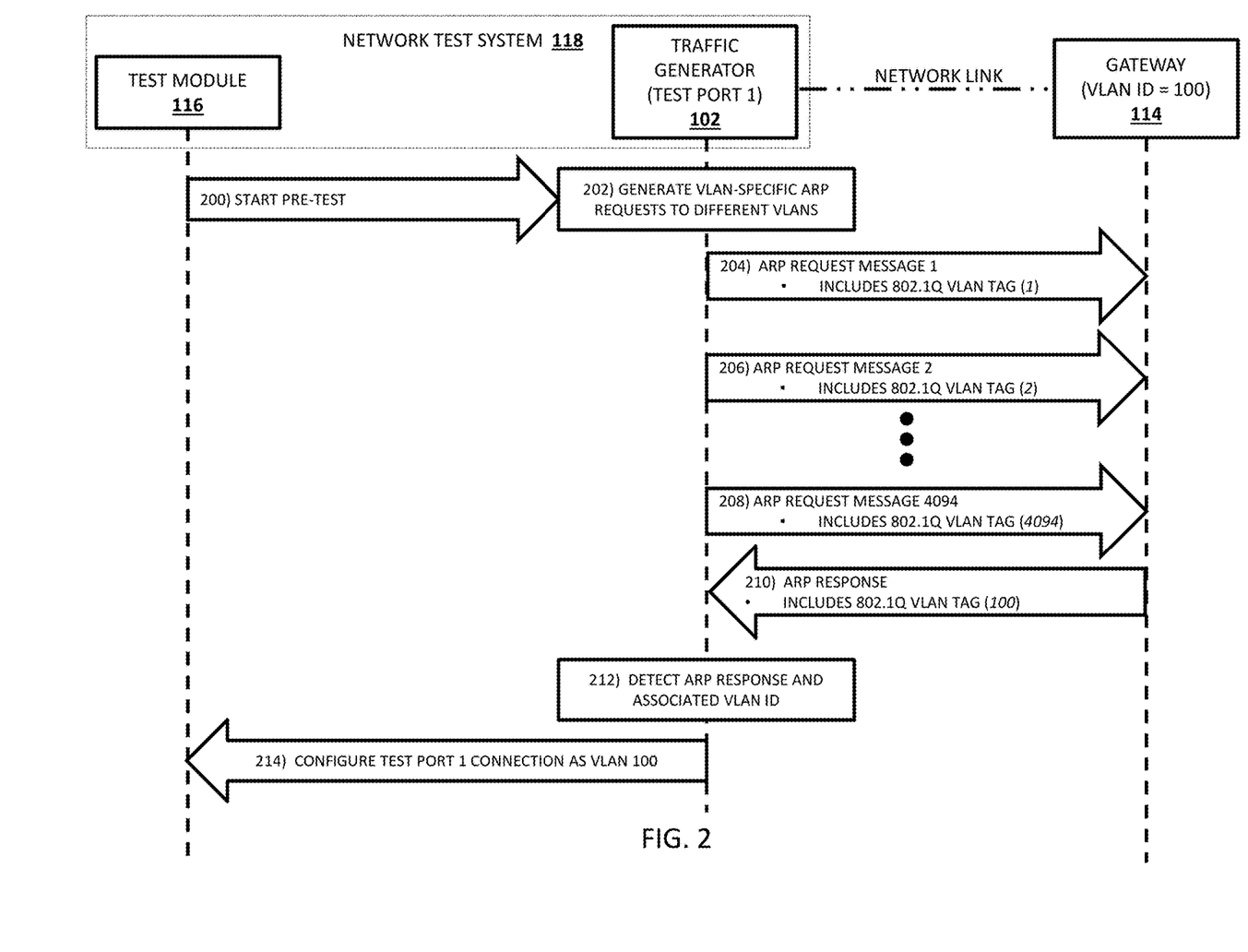
FIG. 2 is a diagram illustrating using address resolution protocol (ARP) messages for VLAN scanning according to an embodiment of the subject matter described herein.

FIG. 2 is a diagram illustrating using ARP messages for VLAN scanning according to an embodiment of the subject matter described herein. In some embodiments, test module 116 may initiate a network configuration procedure for one or more traffic generators, e.g., traffic generator 102. For example, traffic generator 102 may perform various configuration procedures, e.g., performing VLAN scanning to identify an appropriate VLAN for communicating with gateway 114 and/or DUT 112.

In some embodiments, traffic generator 102 may represent a particular test port. For example, test module 116 may utilize multiple test ports for testing different features and/or different types of traffic at DUT 112.

Referring to FIG. 2, in step 201, a pre-test configuration initiation message may be sent from test module 116 to traffic generator 102.

In step 202, traffic generator 102 and/or NCM 106 therein may generate and send (e.g., broadcast) a plurality of VLAN-specific ARP request to gateway 114. For example, each ARP request may include a different VLAN ID.

In step 204, an ARP request message containing VLAN ID of "1" may be sent from traffic generator 102 to gateway 114.

In step 206, an ARP request message containing VLAN ID of "2" may be sent from traffic generator 102 to gateway 114.

In some embodiments, traffic generator 102 may send up to 4094 ARP requests, where a first ARP request includes a VLAN ID of "1" and each subsequent ARP request may increment its VLAN ID by 1 until a last (e.g., the 4094$^{th}$) ARP request is sent that includes a VLAN ID of "4094"

In step 208, an ARP request message containing VLAN ID of "4094" may be sent from traffic generator 102 to gateway 114.

In some embodiments, gateway 114 may be configured to respond to ARP requests that are associated with its VLAN. For example, if gateway 114 is associated with a VLAN ID of "100", in response to receiving an ARP request that includes a VLAN ID of "100", gateway 114 may send an ARP response to traffic generator 102. In this example, gateway 114 may discard or otherwise not response to other ARP requests sent by traffic generator 102.

In step 210, an ARP response containing VLAN ID of "100" may be sent from gateway 114 to traffic generator 102.

In step 212, traffic generator 102 may process the ARP response and may identify a VLAN ID contained therein.

In step 214, configuration information, such as a VLAN ID associated with gateway 114, may be sent to test module 116. For example, traffic generator 102 may store configuration information locally and/or remotely, e.g., at test module or NCM storage 108. In this example, the configuration information may be used by traffic generator 102 and/or test module 116 when generating test packets for testing DUT 112.

In some embodiments, traffic generator 102 and/or NCM 106 may generate a plurality of ARP requests without waiting for responses. In some embodiments, if an ARP response is received from gateway 114 prior to sending all ARP requests, traffic generator 102 may stop sending remaining ARP requests.

In some embodiments, test module 116 may initiate configuration procedures at multiple traffic generators prior to performing a test. For example, test module 116 may send multiple pre-test configuration initiation messages to multiple traffic generators concurrently. In another example, test module 116 may sequentially trigger traffic generator configuration, e.g., test module 116 may send a pre-test configuration initiation message to a second traffic generator after receiving configuration information from traffic generator 102.

It will be appreciated that the communications and/or actions depicted in FIG. 2 are for illustrative purposes and that different and/or additional communications and/or actions than those depicted in FIG. 2 may be used for packet monitoring and/or related activities. It will also be appreciated that various communications and/or actions described herein may occur concurrently or in a different order or sequence.

Figure 3:
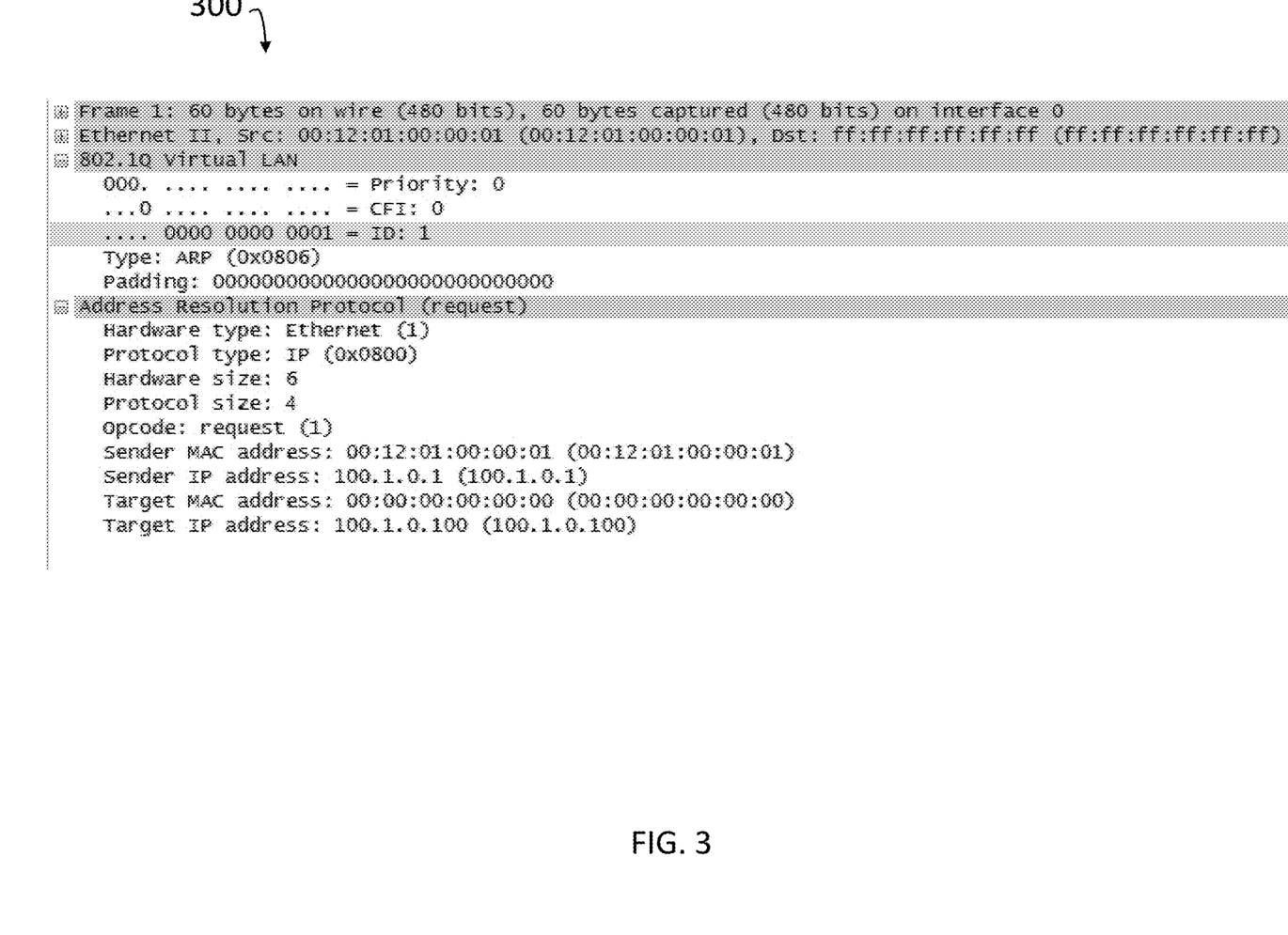
FIG. 3 is a diagram illustrating an example address resolution protocol (ARP) request.

FIG. 3 is a diagram illustrating an example ARP request. As depicted in FIG. 3, an Ethernet frame may include various portions associated with VLAN scanning and/or network test configuration. For example, an Ethernet frame may include an 802.1Q header portion may include VLAN related information, such as a VLAN ID and a protocol type. In this example, the Ethernet frame may also include an ARP request portion indicating, among other things, a hardware type, a protocol type, a hardware size, a protocol size, an opcode, a sender media access control (MAC) address, a sender IP address, a target MAC address, and a target IP address.

It will be appreciated that ARP request 300 is for illustrative purposes and that different and/or additional information may be contained in an ARP request for performing network test configuration and/or VLAN scanning.

Figure 4:
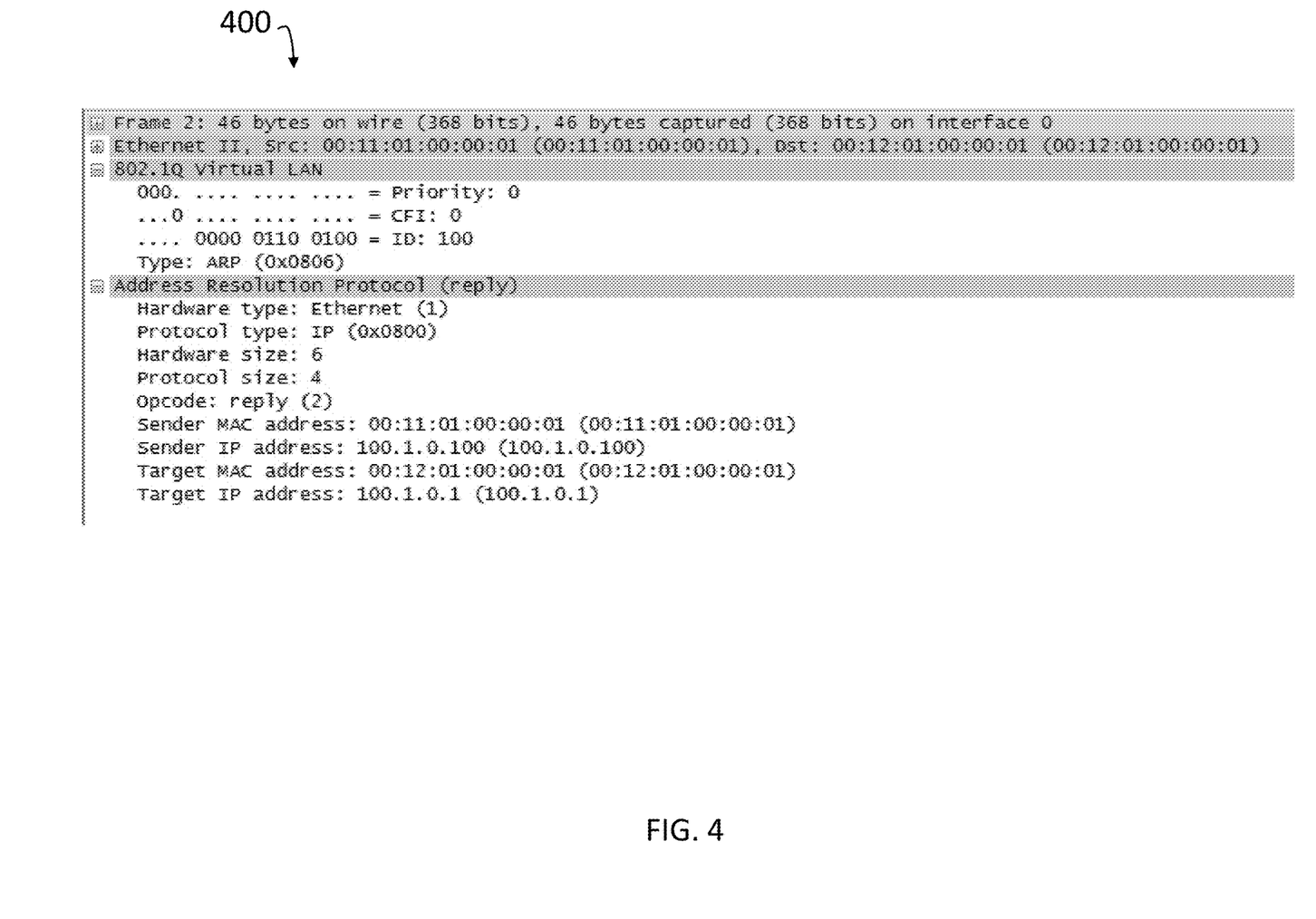
FIG. 4 is a diagram illustrating an example ARP response.

FIG. 4 is a diagram illustrating an example ARP response. As depicted in FIG. 4, an Ethernet frame may include various portions associated with VLAN scanning and/or network test configuration. For example, an Ethernet frame may include an 802.1Q header portion may include VLAN related information, such as a VLAN ID and a protocol type. In this example, the Ethernet frame may also include an ARP request portion indicating, among other things, a hardware type, a protocol type, a hardware size, a protocol size, an opcode, a sender MAC address, a sender IP address, a target MAC address, and a target IP address.

It will be appreciated that ARP request 400 is for illustrative purposes and that different and/or additional information may be contained in an ARP request for performing network test configuration and/or VLAN scanning.

Figure 5:
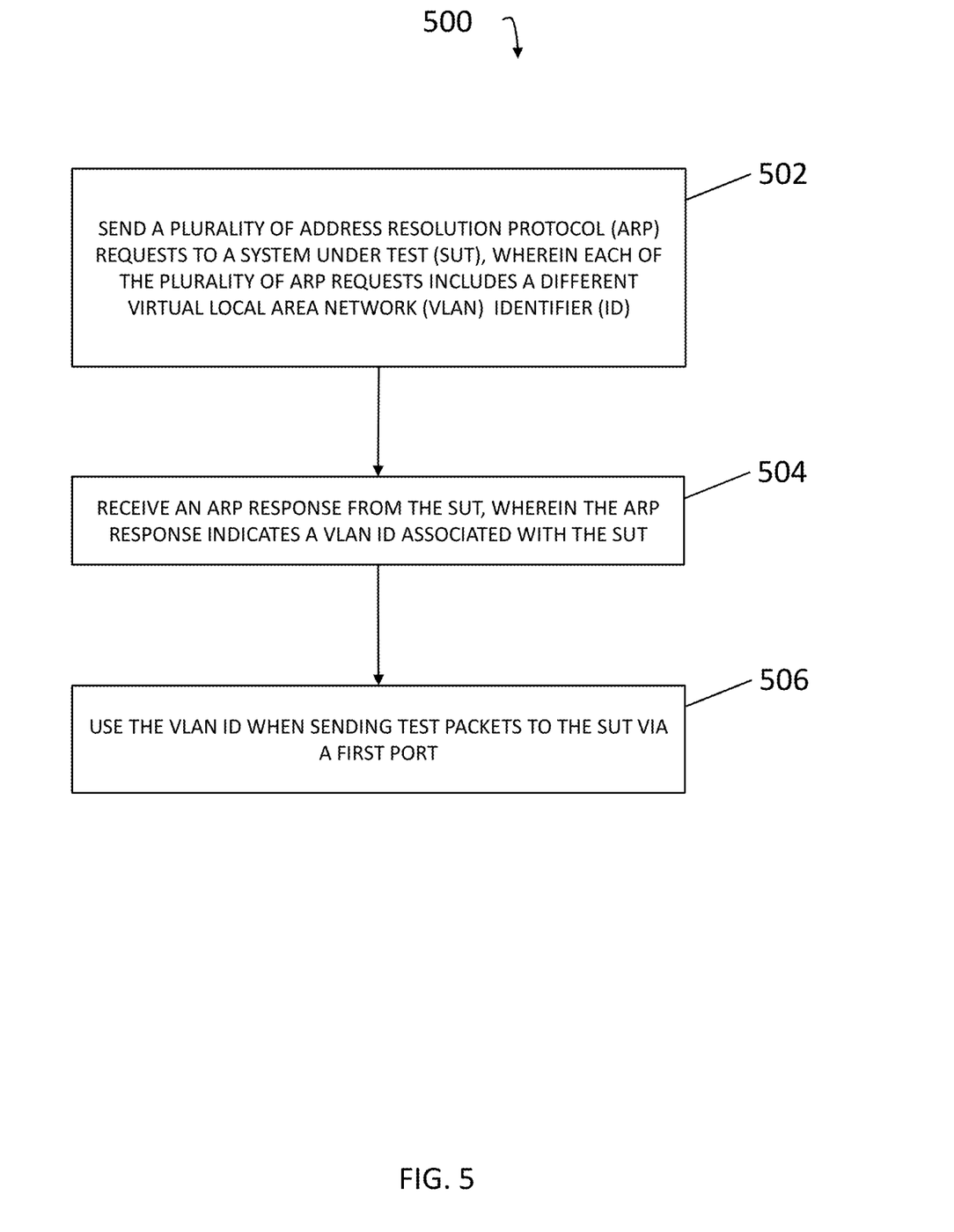
FIG. 5 is a flow diagram illustrating a process for network test configuration using VLAN scanning according to an embodiment of the subject matter described herein.

FIG. 5 is a flow diagram illustrating a process 500 for network test configuration using VLAN scanning according to an embodiment of the subject matter described herein. In some embodiments, process 500, or portions thereof, may be performed by or at network test system 118, NCM 106, processor(s) 104, a network equipment test device, a port of a network equipment test device (e.g., traffic generator 102), and/or another node or module. In some embodiments, process 500 may include steps 502, 504, and/or 506.

Referring to process 500, in step 502, a plurality of ARP requests may be sent to a SUT. In some embodiments, each of the plurality of ARP requests may include a different VLAN ID. For example, traffic generator 102 and/or NCM 106 may send 4094 ARP requests to gateway 114 associated with DUT 112. In this example, each ARP request may contain a unique VLAN ID, e.g., between 1 and 4094. In another example, traffic generator 102 and/or NCM 106 may send 4094 ARP requests to DUT 112.

In step 504, an ARP response may be received from the SUT. In some embodiments, the ARP response may indicate a first VLAN ID associated with the SUT. For example, gateway 114 may send an ARP response containing a VLAN ID "100" associated with gateway 114 and/or DUT 112. In another example, DUT 112 may send an ARP response containing a VLAN ID "100" associated with DUT 112

In step 506, the first VLAN ID may be used when sending test packets to the SUT via a first port. For example, in response to receiving an ARP response containing a VLAN ID "100", traffic generator 102 and/or test module 116 may store the VLAN ID and/or other configuration information and may include this information in test packets used for testing DUT 112.

In some embodiments, multiple test ports may utilize process 500 for obtaining an appropriate VLAN ID for communicating with DUT 112. For example, at a second port of the network equipment test device, traffic generator 102 and/or NCM 106 may send a second plurality of ARP requests to DUT 112. In this example, traffic generator 102 and/or NCM 106 may receive a second ARP response from gateway 114 indicating a second VLAN ID associated with the SUT, and may use the second VLAN ID when sending test packets to the SUT.

In some embodiments, a first VLAN ID identified for a first test port may be the same as a second VLAN ID identified for a second test port. In some embodiments, a first VLAN ID identified for a first test port may be different from a second VLAN ID identified for a second test port. For example, different test ports or traffic generators in network test system 118 may communicate with DUT 112 using different VLANs.

In some embodiments, using a first VLAN ID when sending test packets to a SUT may include storing the first VLAN ID in a memory associated with a network equipment test device. For example, traffic generator 102 or NCM 106 may store a VLAN ID and/or other configuration information in NCM storage 108.

In some embodiments, a plurality of ARP requests may include up to 4094 ARP requests. For example, traffic generator 102 or NCM 106 may generate enough ARP requests so as to scan an entire range of possible VLAN IDs.

In some embodiments, an ARP response may be sent in response to receiving one of a plurality of ARP requests. For example, gateway 114 may be configured to only respond to ARP requests that include its same VLAN ID. In this example, gateway 114 may be configured to ignore or discard other ARP requests.

In some embodiments, a first VLAN ID associated with an SUT may be used by the gateway. For example, gateway 114 and DUT 112 may be associated with a same VLAN.

In some embodiments, a SUT may include a network node, a network, a gateway, a network switch, or a network router. For example, a SUT may include DUT 112 and/or gateway 114. In this example, an ARP response may be sent by gateway 114 or another device (e.g., DUT 112) in a SUT.

In some embodiments, a network equipment test device may include traffic generator 102, an FPGA, an ASIC, or a processor. For example, a network equipment test device may be a network test system 118 and may include various hardware and software components.

In some embodiments, a gateway may be integrated with a SUT. For example, gateway 114 may be implemented as software executing on one or more processors in DUT 112.

In some embodiments, a gateway may be communicatively coupled to a SUT. For example, gateway 114 may be implemented as a separate node from DUT 112 but may be connected via a network.

It will be appreciated that process 500 is for illustrative purposes and that different and/or additional actions may be used. It will also be appreciated that various actions described herein may occur in a different order or sequence.

It should be noted that network test system 118, NCM 106, and/or functionality described herein may constitute a special purpose computing device. Further, network test system 118, NCM 106, and/or functionality described herein can improve the technological field of network test configuration by providing mechanisms (e.g., VLAN scanning using ARP) for identifying a VLAN for communicating with DUT 112. Furthermore, network test system 118, NCM 106, and/or functionality described herein can utilize or include one or more improvements to computer-related technology and/or computer functionality. For example, by using VLAN scanning to identify proper VLAN settings, test platforms can more quickly test networks and/or network nodes.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for network test configuration using virtual local area network (VLAN) scanning, the method comprising:
at each test port of a plurality of test ports of a network equipment test device, wherein the network equipment test device is configured for using address resolution protocol (ARP) packets to identify an appropriate VLAN identifier (ID) to use for each of the plurality of test ports during testing and the network test equipment device stores associations between the test ports and the identified VLAN IDs in a memory:
determining, using VLAN scanning, a respective VLAN ID for communicating with a system under test (SUT) via a respective test port by sending, without waiting for responses between transmissions, a plurality of ARP requests to a gateway associated with the SUT, wherein each of the plurality of ARP requests includes a different VLAN ID and a same target IP address and receiving an ARP response from the SUT, wherein the ARP response indicates the respective VLAN ID associated with the SUT; and
using the respective VLAN ID when sending test packets to the SUT via the respective test port, wherein the network equipment test device comprises a user equipment (UE) emulator for emulating a plurality of UE devices by sending UE device control plane traffic to the SUT, wherein the UE emulator accesses the memory containing the stored associations for obtaining the respective VLAN ID for generating the UE device control plane traffic associated with the respective test port.

2. The method of claim 1 wherein a first VLAN ID associated with a first test port of the plurality of test ports is different from a second VLAN ID associated with a second test port of the plurality of test ports.

3. The method of claim 1 wherein a first VLAN ID associated with a first test port of the plurality of test ports is the same as a second VLAN ID associated with a second test port of the plurality of test ports.

4. The method of claim 1 wherein the plurality of ARP requests includes up to 4094 ARP requests.

5. The method of claim 1 wherein the ARP response is sent in response to receiving one of the plurality of ARP requests.

6. The method of claim 1 wherein the SUT includes a network node, the gateway, a network, a network switch, or a network router.

7. The method of claim 1 wherein the network equipment test device includes a traffic generator, a field programmable gate array (FPGA), an application-specific integrated circuit (ASIC), or a processor.

8. A system for network test configuration using virtual local area network (VLAN) scanning, the system comprising:
at least one processor; and
a network equipment test device implemented using the at least one processor, the network equipment test device is configured for using address resolution protocol (ARP) packets to identify an appropriate VLAN identifier (ID) to use for each of a plurality of test ports during testing and the network test equipment device stores associations between the test ports and the identified VLAN IDs in a memory, wherein the network equipment test device is further configured for:
at each test port of the plurality of test ports of the network equipment test device:
determining, using VLAN scanning, a VLAN IDs in a memory:
determining, using VLAN scanning, a respective VLAN ID for communicating with a system under test (SUT) via a respective test port by sending, without waiting for responses between transmissions, a plurality of ARP requests to a gateway associated with the SUT, wherein each of the plurality of ARP requests includes a different VLAN ID and a same target IP address and receiving an ARP response from the gateway, wherein the ARP response indicates the respective VLAN ID associated with the SUT; and
using the respective VLAN ID when sending test packets to the SUT via the respective test port, wherein the network equipment test device comprises a user equipment (UE) emulator for emulating a plurality of UE devices by sending UE device control plane traffic to the SUT, wherein the UE emulator accesses the memory containing the stored associations for obtaining the respective VLAN ID and uses the respective VLAN ID when generating the UE device control plane traffic associated with the respective test port.

9. The system of claim 8 wherein a first VLAN ID associated with a first test port of the plurality of test ports is different from a second VLAN ID associated with a second test port of the plurality of test ports.

10. The system of claim 8 wherein a first VLAN ID associated with a first test port of the plurality of test ports is the same as a second VLAN ID associated with a second test port of the plurality of test ports.

11. The system of claim 8 wherein the plurality of ARP requests includes up to 4094 ARP requests.

12. The system of claim 8 wherein the ARP response is sent in response to receiving one of the plurality of ARP requests.

13. The system of claim 8 wherein the SUT includes a network node, the gateway, a network, a network switch, or a network router.

14. The system of claim 8 wherein the network equipment test device includes a traffic generator, a field programmable gate array (FPGA), an application-specific integrated circuit (ASIC), or a processor.

15. A non-transitory computer readable medium having stored thereon executable instructions that when executed by at least one processor of a computer cause the computer to perform steps comprising:
at each test port of a plurality of test ports of a network equipment test device, wherein the network equipment test device is configured for using address resolution protocol (ARP) packets to identify an appropriate VLAN identifier (ID) to use for each of the plurality of test ports during testing and the network test equipment device stores associations between the test ports and the identified VLAN IDs in a memory:
determining, using VLAN scanning, a respective VLAN ID for communicating with a system under test (SUT) via a respective test port by sending, without waiting for responses between transmissions, a plurality of ARP requests to a gateway associated with the SUT, wherein each of the plurality of ARP requests includes a different VLAN ID and a same target IP address and receiving an ARP response from the SUT, wherein the ARP response indicates the respective VLAN ID associated with the SUT; and using the respective VLAN ID when sending test packets to the SUT via the respective test port, wherein the network equipment test device comprises a user equipment (UE) emulator for emulating a plurality of UE devices by sending UE device control plane traffic to the SUT, wherein the UE emulator accesses the memory containing the stored associations for obtaining the respective VLAN ID for generating the UE device control plane traffic associated with the respective test port.

\* \* \* \* \*